United States Patent [19]
Ahlen

[11] 4,347,761
[45] Sep. 7, 1982

[54] HYDROMECHANICAL TRANSMISSIONS

[75] Inventor: Karl G. Ahlen, Bromma, Sweden

[73] Assignee: S.R.M. Hydromekanik Aktiebolag, Stockholm-Vallingby, Sweden

[21] Appl. No.: 66,860

[22] Filed: Aug. 15, 1979

[30] Foreign Application Priority Data

| Aug. 18, 1978 | [GB] | United Kingdom | 33809/78 |
| Aug. 24, 1978 | [GB] | United Kingdom | 34391/78 |
| Nov. 6, 1978 | [GB] | United Kingdom | 43313/78 |
| Nov. 6, 1978 | [GB] | United Kingdom | 43315/78 |
| Nov. 21, 1978 | [GB] | United Kingdom | 45431/78 |
| Nov. 21, 1978 | [GB] | United Kingdom | 45432/78 |

[51] Int. Cl.³ .................. F16H 47/00; B60K 41/04
[52] U.S. Cl. .................. 74/732; 74/677; 74/864; 74/866
[58] Field of Search .......... 74/866, 733, 860, 732, 74/867, 677, 688, 752 D, 861, 863, 864

[56] References Cited

U.S. PATENT DOCUMENTS

| 3,805,640 | 4/1974 | Schneider et al. | 74/866 X |
| 3,874,255 | 4/1975 | Minami | 74/866 |
| 3,876,028 | 4/1975 | Asano et al. | 74/866 X |
| 3,893,551 | 7/1975 | Ahlen | 74/732 X |
| 4,033,202 | 7/1977 | Ahlen et al. | 74/866 |
| 4,056,019 | 11/1977 | Ahlen | 74/677 |
| 4,058,980 | 11/1977 | Ahlen | 60/337 |
| 4,208,925 | 6/1980 | Miller et al. | 74/866 |
| 4,262,335 | 4/1981 | Ahlen et al. | 74/752 D X |
| 4,262,554 | 4/1981 | Ahlen et al. | 74/868 X |

Primary Examiner—Rodney H. Bonck
Attorney, Agent, or Firm—Larson and Taylor

[57] ABSTRACT

This invention relates to a power group for driving a vehicle comprising a torque converter component, a complementary gear component, a component including a feeder fluid pump system, and a component including an automatic and manual control whereby not only the individual components are used to provide their optimum effect but also the combined effect of the individual components is optimized.

17 Claims, 4 Drawing Figures

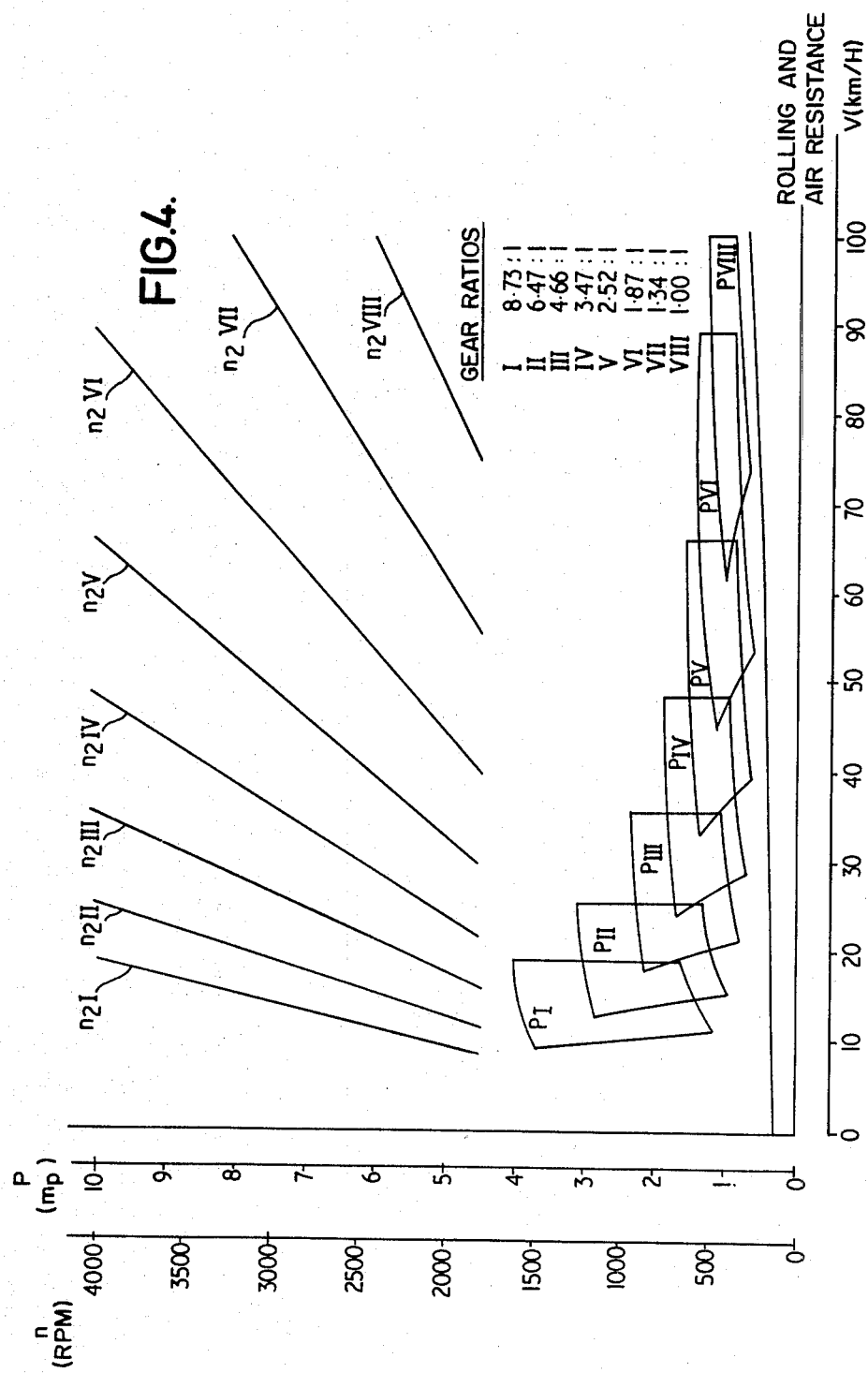

HYDROMECHANICAL TRANSMISSIONS

This invention relates to a power group for driving a vehicle.

BACKGROUND OF INVENTION

It is becoming more and more desirable that the performance of the power group, that is, an engine and transmission combination for vehicles must be developed from their present state in order to improve their utilisation of available fuel energy. Such a desirable development requires increased overall performance, increased efficiency of the transmission, better use of the engine in favourable ranges, adaptation of the transmission to allow design of the engine to produce output power as cheaply as possible with least variation of conditions under which the engine is used and, further, to enable a manufacturer to vary the composition of the transmission to suit the type of vehicle in question without losing sight of the main preferred features.

Another demand of future transmissions which is not satisfied by known transmissions is that economical driving conditions are automatically set according to specific demand for the vehicle and its use.

A further aim for a future transmission must be to reduce the demand for high quality and expensive materials and to reduce both the size of transmission and servicing as well as extending the trouble-free operation time of the vehicle.

The situation today is that automatic transmissions normally have higher fuel consumption for each ton-mile transport than the manually controlled synchromesh transmissions. The situation is also that the increased power of the vehicles has shortened the life of both engine and transmission and increased the servicing requirements. Generally speaking current transmissions are only suitable for a limited field of use or it is left to the ability of the driver to influence fuel consumption and the utilization of performance factors.

OBJECT OF INVENTION

It is an intention of this invention to improve and widen the performance of a hydromechanical transmission. The intention is to widen the performance with a combined effect of the torque converter and the complementary gear for braking purpose, and to improve the performance both as to efficiency and behaviour during shifts by utilizing components having certain individual characteristics which together produce a combination effect improving the general performance, and also a total structure which allows an automatic system to be programmed to take into account special running conditions such as the relationship between weight of the vehicle and setting of the engine and, moreover, to let this influence the setting on the transmission.

The main effect is obtained by the interrelationship between the components performance as later described. It is also an intention of the invention by selection of specific characteristics of the components to reduce the size and the weight and simplify the structure thereby improving the adaptability of the transmission, and reduce the cost of a high performance power group of the type preferably used in heavy town bus traffic and for TIR-trucks and off-the-road trucks.

SUMMARY OF INVENTION

Considered broadly, the present invention provides a hydromechanical automatic transmission built up of specific components in which the special features of the specific components produce to a desired overall performance as well as a desired possibility to vary performance in accordance with demand. The components can be regared as individual parts from both from the servicing standpoint and also from the point of view of permitting variation within the main structure to adapt the transmission for each specific demand. The transmission has a control system which can be programmed to meet the specific demand of the type of vehicle concerned as well as of the individual demands of the user. Further the transmission does not only fulfil a desired driving performance but also a desired braking performance in which the transmission is used as a part of what may be regarded as the power group.

In more detail the invention provides a power group for driving a vehicle, comprising a torque converter component, a complementary mechanical gear component, a component including a feeder fluid pump system, a component including a valve system and a component including an automatic and a manual control means characterised in that:

A. The torque converter component comprises at least one pump member, at least one guide member and at least one turbine member with a ring of turbine blades following the pump member, a lock-up clutch and a friction clutch permitting the guide member to be locked against rotation;

B. The complementary mechanical gear component is a servo-motor controlled multiple speed complementary gear of the power shift type having one planet gear carrier and a plurality of planetary gears providing a plurality of different gear ratios.

C. The feeder fluid pump system is servo-motor controlled and includes one variable capacity pump, one high pressure pump and a heat exchanger;

D. The valve system includes one disc valve arrangement for controlling the flow of feeder fluid at one pressure through the converter and through the heat exchange, with the valves thereof adapted to open and close relatively large port areas upon relatively short movements of the valves and a second disc valve arrangement for controlling the flow of feeder fluid at another, pressure for the complementary mechanical gear servo-motors with the valves thereof adapted to open and close relatively large port areas upon relatively short movements of the valves;

E. The automatic control means including a micro computer for computing input signals dependent upon "primary speed", "output shaft speed" and "fuel injection settings" in accordance with preprogrammed memories and according to manual settings so as to produce any selected one or more of the following:

1. Output signals determining operation of components A, B, C, or D to obtain hydraulic drive at accelerations above a predetermined value and below a predetermined speed of the output shaft;

2. Operate the feeder fluid pump system at a high capacity level below a certain speed ratio of the torque converter and during gear shifts and at hydraulic braking;

3. Operate the feeder fluid pump system at a low capacity level under all other driving conditions and 4. Operate the complementary mechanical gear and the torque converter when the automatic control is set for braking according to braking demand and speed conditions.

The use of the friction clutch associated with the guide member serves to allow modulation of the braking of the vehicle. Further, since the friction clutch associated with the guide member permits the guide member to be locked against rotation or released, the complementary mechanical gear is operated with low losses during gear shifts.

The arrangement of the feeder fluid system enables a high efficiency of the transmission to be obtained during prolonged running and rapid gear shifts with good cooling. In addition, the use of disc valves allows not only rapid shifts but also excellent control of the gear shifts.

The automatic and manual control component enables a driver to obtain not only the best use of individual components of the power group but also the best combined effect of the components under prevailing driving conditions and braking under both manual and automatic control. Reference is also made to the following commonly owned co-pending U.S. applications which describe the said components in greater detail, namely Ser. No. 066,859, filed Aug. 15, 1979, now U.S. Pat. No. 4,262,554; Ser. No. 066,536, filed Aug. 15, 1979; Ser. No. 3,527, filed Jan. 15, 1979, now U.S. Pat. No. 4,262,335; Ser. No. 3,526, filed Jan. 15, 1979.

During a gear shift in the complementary gear, a driver can set the torque converter for high capacity for obtaining good gentle gear shifts. Considered slightly differently, since the capacity of the torque converter is adjustable under manual and automatic control, the pressure level is also controlled so that when the gear is transmitting high torque, the capacity is high whereas during gear shifts the capacity is low and the torque is also low. For example, during maximum braking a high cooling capacity is achieved by controlling the feeder fluid pump at maximum capacity. For braking at different levels, not only can the said pump capacity be varied but also, engine, torque converter and gear settings can be varied as required. As far as the torque converter is concerned, a high stall-torque ratio is obtained by setting the pump for high capacity, i.e. high pressure, which also results in conjunction with the heat exchange in good cooling.

BRIEF DESCRIPTION OF DRAWINGS

FIGS. 3 and 4 are diagrams showing selected operating characteristics of the transmission. Specifically, FIG. 3 is a maximum power/tractive effort diagram and FIG. 4 shows the braking force obtainable at different speeds.

DETAILED DESCRIPTION OF THE PREFERRED EMBODIMENTS

Figure 1:
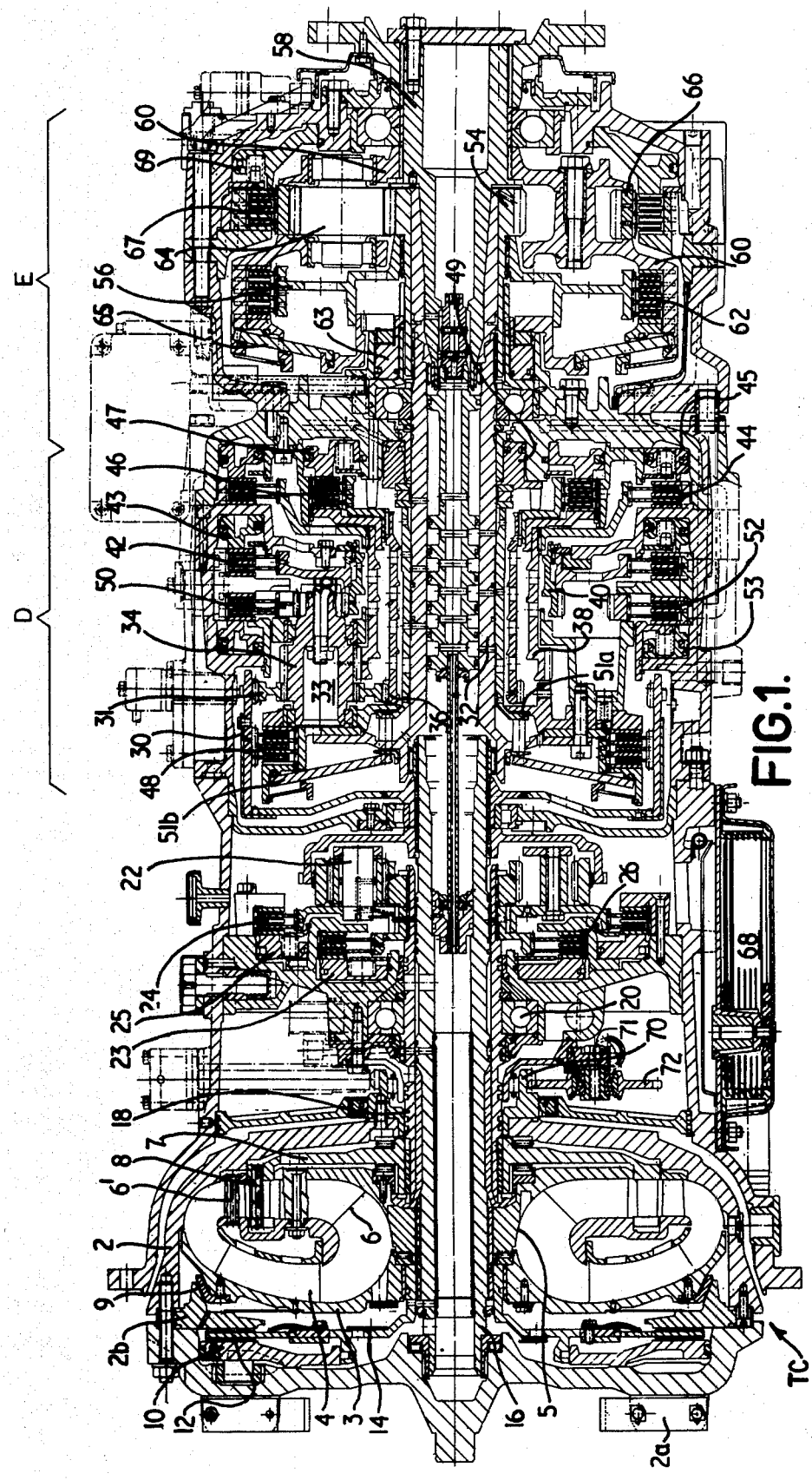
FIG. 1 is a longitudinal cross section of a transmission according to the invention.

FIG. 1 shows a torque converter TC including a rotating casing 2 adapted to be driven by a vehicle engine via abutment means 2a. The torque converter TC has a pump member 3 with pump blades 4, a turbine member 5 with rings of turbine blades 6/6' and a guide member 7 with guide blades 8. The guide member may be used as a turbine. Connected to the turbine member 5 is a hub 14 to which is attached a friction disc 12. The rotating casing 2 includes an inward extension 2b between the disc 12 and the pump member 3 and a servo piston 10 on the outer side of disc 12. The torque converter TC is of the releasable pump member type described in U.S. Pat. No. 3,893,551. The pump member 3 is movable to the left for engagement with the rotating casing 2 via a friction coupling 9 for hydraulic drive. When the pump member 3 is moved to the right, the coupling is released and the servo piston 10 is actuated to urge disc 12 into frictional engagement with extension 2b for direct drive between the rotating casing 2 and the turbine member 5. The turbine member 5 and the hub 14 are drivingly engaged with the turbine shaft 16. The guide member 7 is mounted on a guide shaft 18 which rotates relative to turbine shaft 16 and which is mounted in bearing 20. The shaft 18 is connected via a hub and friction discs to a brake 26 operable by servo pistons 23 for holding the guide member 7 stationary for "single rotation". Shaft 18 is further connected to a planetary gear 22, the carrier of which is connected to friction discs forming a part of a brake 24 which is operated by servo piston 25, whereby the guide member rotates oppositely from the turbine member for "double rotation". In hydraulic drive, torque multiplication is achieved via the turbine member to the turbine shaft 16. "Double rotation" is obtained with brake 24 actuated and allows a much higher multiplication of torque but over a smaller range of speed ratios, than does single rotation (achieved by engagement of brake 26 by means of servo piston 23) wherein speed ratio is defined as the ratio of turbine shaft speed to rotating casing speed. Torque multiplication decreases with increasing speed until it becomes advantageous to disconnect hydraulic drive, i.e. disconnect the conical coupling 9, and to actuate servo piston 10 to drive the turbine shaft 16 directly from the rotating casing 2 via elements 12 and 14.

The torque converter includes a heat exchanger 68 through which fluid is pumped by a gear 70 via an intermediate gear 72 which operates gear pump 71. An arrangement of a torque converter, a heat exchanger of this type, a pump and appropriate fluid lines, is described in U.S. Pat. Nos. 4,056,019 and 4,058,980.

To obtain overspeed of the turbine, there is disposed downstream from the torque converter, a mechanical gear including a first portion D with four forward gear ratios and a reverse gear, and a second or "range gear" E having either a 1:1 drive or a further gear reduction. Such an arrangement is described in co-pending commonly owned U.S. Application Ser. No. 843,520 filed Oct. 19, 1977, now abandoned.

The turbine shaft 16 is connected to a ring gear 30. The secondary or output shaft of the said first portion is designated 32. Ring gear 30 drives a planetary gear 33 having a plurality of gear sections including a large diameter gear section 31 splined onto an intermediate diameter gear section 34 with a smaller diameter gear section 35 to the right. Between the gear sections 34 and 35 is a bearing for mounting the planetary gear 33.

Gear sections 31, 34 and 35 are respectively drivingly engaged with splines of sun gears 36, 38 and 40. The gear section 35 is further engaged with a ring gear 50 operating as a reverse gear. Sun gears 36, 38 and 40 are either released for free rotation or connected to the stationary portion of the casing via friction brakes 46, 44 and 42, respectively, which friction brakes are actuated by servo pistons 47, 45 and 43, respectively. Reverse gear 50 is selectively engaged with the casing via friction brake 52 which is actuated via servo piston 53.

Alternatively, ring gear 30 can be connected directly to the carrier of planetary gear 33 and hence directly to secondary shaft 32 by engagement of friction clutch 48, the latter caused by actuation of servo piston 49, this in turn urging member 51a to the left to turn lever 51b such that its upper portion moves to the right to engage clutch 48.

Shaft 32 extends toward the right in FIG. 1 where it drivingly engages an elongated splined member 54 which is drivingly engaged with both a hub 56 and planetary gears 64. The holder 60 of planetary gear 64 is drivingly engaged with a secondary gear 58 which is the ouput shaft of the entire transmission.

Planetary gear 64 is engaged with a ring gear 66 which can be braked relative to the stationary portion of the housing by means of a friction brake 67 which is actuated by servo piston 69. This arrangement permits a speed reduction between shafts 32 and 58. Alternatively, shafts 32 and 58 may be operatively engaged to each other via hub 56 and friction clutch 62, the latter frictionally engaging hub 56 with the planetary gear holder 60. Friction clutch 62 is actuated via a servo piston 63 which acts via a lever system 65.

Figure 2:
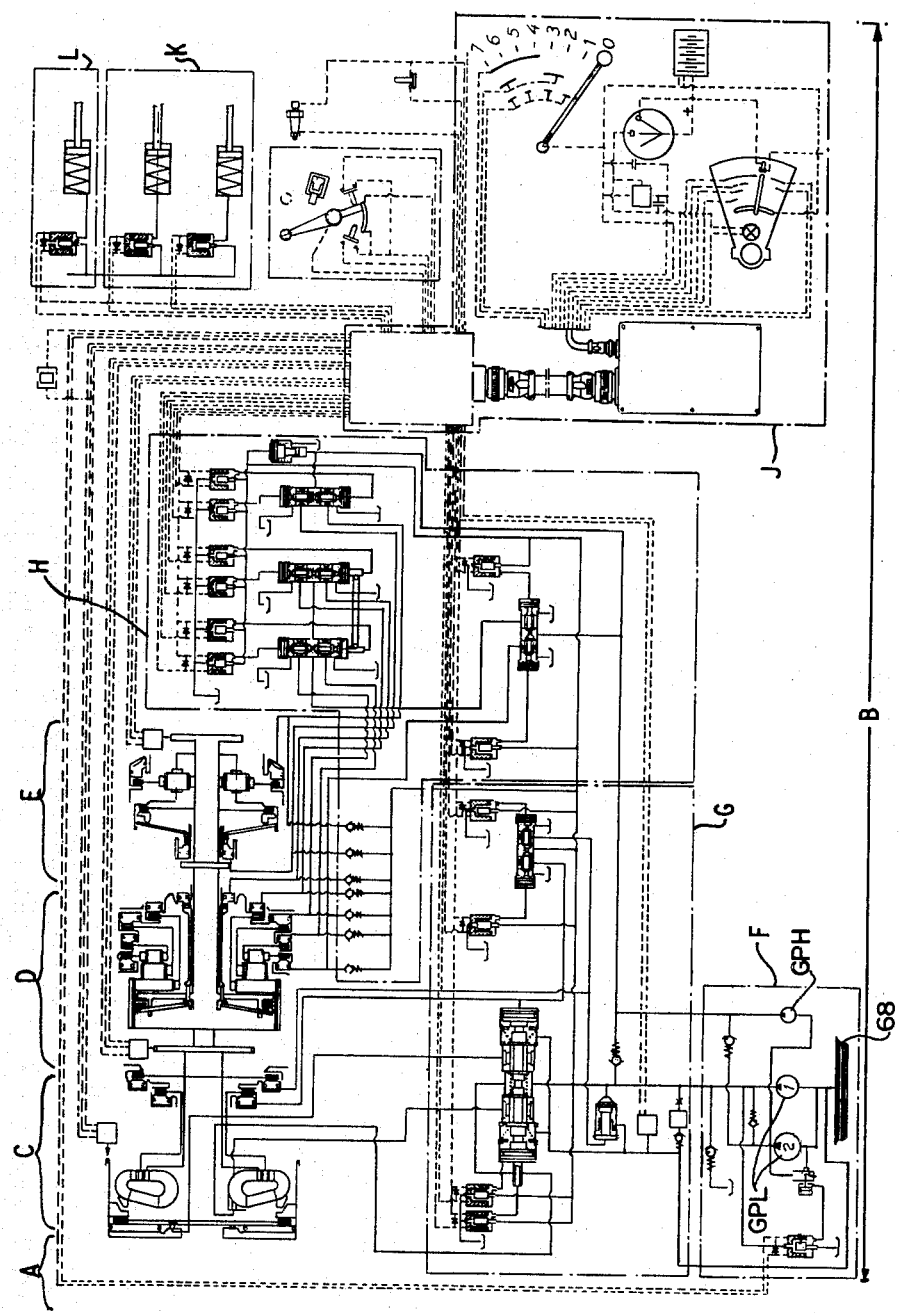
FIG. 2 is a schematic diagram of the essential components of FIG. 1 together with the mechanical and electronic controls thereof.

Referring to the schematic diagram of FIG. 2, the various components thereof are alphabetically designated A to K and are briefly summarised below.

A. Prime mover, e.g. a diesel engine;
B. A vehicle transmission composed of:
Following elements
C. a torque converter including a lock-up clutch;
D. a 3- or 4-speed power shift planetary gear;
E. a range gear;
F. a system for producing pressurised fluid for lubricating, cooling and actuating couplings and brakes;
G. a first valve system for distributing pressure fluid to the torque converter couplings and brakes;
H. a second valve system for controlling servo-motor operated and brakes of the power shift gear assemblies (D and E);
J. a remote control and automatic control system for controlling the operation of the engine and the torque converter
K. a servo-arrangement for controlling the setting of the engine in accordance with the control systems of J, and,
L. a servo-arrangement for controlling the setting of a compression braking throttle.

C. The torque converter should preferably have an input torque characteristic which increases with engine speed within a range from stall up to the shift point and when connecting direct drive, the engine speed is adjusted to match the output speed. Further, the torque converter is preferably constructed to permit torque absorption of the turbine when overspeeding the turbine and adjustment of the torque absorption is achieved by modulating the engine speed mechanical.

D. Conveniently, the multiple speed gear has only one planet gear carrier which constitutes the output shaft of the gear and a plurality of planetary gears each with multiple meshing gear sections and each section including one or two ring gears.

E. The range gear has a gear ratio between direct gear and the lowest gear ratio, the said gear ratio of the range gear being larger than the total gear ratio of the first gear.

F. The feeder fluid pump arrangement supplies pressure fluid to the torque converter and servo motor operated clutches and/or brakes of the transmission and is characterized firstly by a pair of low pressure fluid pumps GPL operable by a single impulse to obtain two different fluid circulation quantities in relation to speed and a number of different fluid pressure levels depending on the volume delivered, and secondly by a high pressure pump GPH fed with fluid from one of the low pressure pumps.

G.H. The first and second valve systems include a plurality of servo-operated disc valves adapted to rapidly open and close fluid connections to electrohydraulic valves for controlling operation of the transmissions. Further, the sealing surfaces of servo-operated disc valves are not exposed to wear, thereby reducing fluid leakage and the system includes means for establishing a relationship between the pressure of the low oil pressure operating the valves and the pressure of the high pressure oil operating the servo-motors of the brakes and clutches.

J. The automatic remote control system includes normal manual setting arrangements and sensors to initiate primary impulses used to determine output signals which according to predetermined critieria, control operation of the transmission in accordance with a driving conditions.

The combination of the above components in accordance with the invention results in an increased average speed of the vehicle, safer running of the vehicle, lower fuel consumption in relation to ton-miles, transport and average speed. A further advantage is the relatively small dimension and low weight of the vehicle transmission for a certain size of the engine, which reduces the costs and improves the adaptability of the transmission. It is, therefore, possible to utilize a transmission with high performance within an available space and, moreover it is not the driver but the auto pilot which ensures maximum use of the engine and selection of the best ranges thereby improving fuel consumption and, since the transmission itself has extremely low so-called speed responsive losses, power is also conserved. At the same time, the possibility exists for a driver to manually control the transmission.

When determining a particular setting for the transmission the automatic control system takes into consideration not only the normal conditions but also in contrast to known automatic control systems, the load on the vehicle, hill climbing conditions, and the setting of braking to a "level" or intensity independent of or related to speed of the vehicle.

Figure 3:
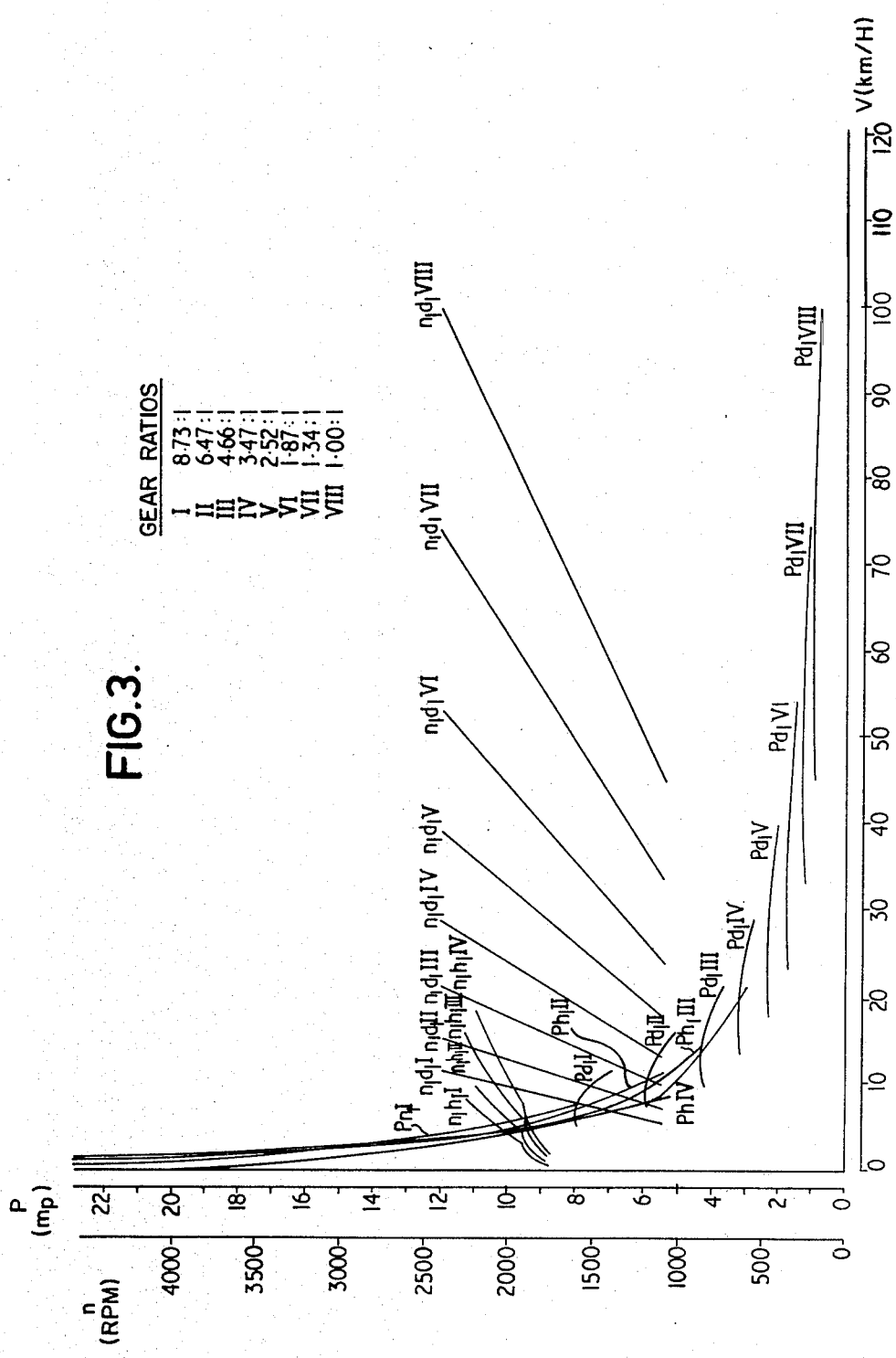

The transmission provides eight forward gear steps as shown schematically and numerically in FIG. 3. The first four gear steps are the four forward gear ratios with the brake 67 of the mechanical range gear connected to the stationary casing, thereby providing a reduction gear ratio through the mechanical transmission. The next four gear steps V to VIII are the same four gear steps of mechanical transmission but with the input to mechanical range gear connected directly to the output shaft 58 via engagement of brake 62.

If the throttle is depressed to a maximum, the tractive effort illustrated in FIG. 3 at curve $Pn_1I$ is achieved. However, normally, the vehicle accelerates faster than the engine in the low gears, and therefore this high tractive effort is not actually obtained except when climbing extremely steep gradients. When, however, the vehicle has accelerated to a certain point in relation to the engine speed, the guide member 7 is disconnected from the turbine and connected to the stationary casing, i.e. brake 24 is released and brake 26 is engaged, which of course produces normal single rotation drive. This condition continues until a point is reached when direct drive is required at which point coupling 9 is disengaged, the pump member 3 is freed from the rotating casing and piston 10 is then activated to engage the disc 12 with the extension 2b of the rotating casing 2. The point at which the transition from one condition to the other occurs is related to the throttle-pedal position which will be at different speed ratios between the pump member and the turbine member after which the vehicle has accelerated sufficiently. In first gear the vehicle can now accelerate up to about 12 km/hour and the tractive effort is represented by the curve $Pd_1I$ in the case of maximum throttle. Normally, the first two or three gear steps of the mechanical transmission are used only for starting under severe conditions or for driving fully loaded up very high grades. Normally, therefore, the automatic control means will have already connected up to the fifth gear or possibly up to the eighth gear before some type of braking or retardation is required.

In conventional hydraulic braking of the torque converter, direct drive is connected and the guide member 7 is held fixed to the stationary casing or, at lower vehicle speeds, the guide member 7 can be connected to the turbine at brake 24 (again, with direct drive connected) thereby making the guide member rotate backwards.

While this conventional type of braking is satisfactory, it does not allow regulation or modulation of the braking except by connecting different gears. In accordance with the present invention it is possible to obtain hydraulic braking by overspeeding the turbine, having disconnected the direct drive connection. In this arrangement, the automatic control means connects a gear for a certain overspeeding of the turbine as shown diagrammatically in FIG. 4. In FIG. 4 the lines marked $n_2$ with the indices I–VIII indicate turbine speeds, and the areas marked P with indices I–VII indicate the retardation or braking force obtainable, the lower limits of the obtained retardation force being with a released guide member and with the engine running due to torque transmitted from the turbine member to the pump member.

In FIG. 4, seven braking fields are obtained with eight gear steps and, for four gear steps, three braking fields are obtained.

We claim:

1. A hydromechanical transmission for driving a vehicle, comprising a torque converter component, a complimentary mechanical gear component, a feeder fluid pump system component, a valve system component and an automatic and a manual control means component, wherein:
   (A) the torque converter component comprises at least one pump member, at least one guide member and at least one turbine member with a ring of turbine blades following the pump member, a direct drive lock-up clutch and a friction clutch permitting the guide member to be locked against rotation in at least one direction;
   (B) the complimentary mechanical gear component is a servo-motor controlled multiple speed mechanical gear of the power shift type having one planet gear carrier and a plurality of planetary gears providing a plurality of different gear ratios;
   (C) the feeder fluid pump system component is servo-motor controlled and includes at least one variable capacity pump unit;
   (D) the valve system component includes one disc valve arrangement for controlling the flow of feeder fluid through the converter, with the valves thereof adapted to open and close relatively large port areas upon relatively short movements of the valves and a second disc valve arrangement for controlling the flow of feeder fluid to the complimentary mechanical gear servo-motors with the valves thereof adapted to open and close relatively large port areas upon relatively short movements of the valve; and
   (E) the automatic control means component includes a microprocessor for receiving input signals relating to "primary speed", "output shaft speed" and "fuel injection settings" and for processing said signals in accordance with preprogrammed memories and according to manual settings so as to produce output signals to determine operation of the torque converter component and the complimentary mechanical gear component.

2. A hydromechanical transmission according to claim 1, wherein said microprocessor includes means for providing output signals to obtain hydraulic drive at accelerations above a predetermined value and below a predetermined speed of the output shaft.

3. A hydromechanical transmission according to claim 1, wherein said microprocessor includes means for providing output signals to operate the feeder fluid pump system at a high capacity level below a certain speed ratio of the torque converter and during gear shifts and at hydraulic braking.

4. A hydromechanical transmission according to claim 1, wherein said microprocessor includes means for providing output signals to operate the feeder fluid pump system component at a low capacity level under all direct drive conditions.

5. A hydromechanical transmission according to claim 1, wherein said microprocessor includes means for providing output signals to operate the feeder fluid pump system at a high capacity level below a certain speed ratio of the torque converter and during gear shifts at hydraulic braking and to operate the feeder fluid pump system at a low capacity level under all other driving conditions.

6. A hydromechanical transmission according to claim 1, wherein said microprocessor includes means for providing output signals to operate the complimentary mechanical gear and the torque converter when the automatic control is set for braking according to braking demand and speed conditions.

7. A hydromechanical transmission according to claim 1, wherein said microprocessor includes means for providing output signals (1) to obtain hydraulic drive at accelerations above a predetermined value and below a predetermined speed of the output shaft, (2) to operate the feeder fluid pump system at a high capacity level below a certain speed ratio of the torque converter and during gear shifts and at hydraulic braking, (3) to operate the feeder fluid pump system at a low capacity level under all other driving conditions and (4) to operate the complimentary mechanical gear and the torque converter when the automatic control is set for braking according to braking demand and speed conditions.

8. A hydromechanical transmission according to claim 1, wherein the pump system component further includes a high pressure pump.

9. A hydromechanical transmission according to claim 8, wherein the said microprocessor includes means for processing output signals to operate the feeder fluid pump system at a high capacity level below a certain speed ratio of the torque converter and during gear shifts and at hydraulic braking, and to operate the feeder fluid pump system at a low capacity level under all other driving conditions.

10. A hydromechanical transmission according to claim 1, including a heat exchanger and said valve system component including means for controlling the flow of fluid through the torque converter at one pressure and through the heat exchanger at another pressure.

11. A hydromechanical transmission according to claim 1, and further including a two speed range gear.

12. A hydromechanical transmission according to claim 1 or claim 11, wherein the automatic control means component includes means for setting "engine fuel injection" during gear shifts and during braking.

13. A hydromechanical transmission according to claim 1, in which the complimentary mechanical gear servo-motors are non-rotatable servo-motors.

14. A hydromechanical transmission according to claim 13, including both a low pressure pump and a high pressure pump, and wherein the high pressure pump has a relatively low capacity.

15. A hydromechanical transmission according to claim 1, wherein the torque converter includes a rotatable casing, and wherein the pump member of the torque converter is releasable from said casing.

16. A hydromechanical transmission according to claim 1, wherein all valves are servo-motor operated and the servo-motors are controlled by electro hydraulic valves.

17. A hydromechanical transmission according to claim 1, wherein the automatic control means component includes means for controlling hydraulic braking and in conjunction with the automatic control means component sets the torque converter component, the complimentary mechanical gear component and the engine in relation to vehicle speed for braking at different levels.

* * * * *